United States Patent [19]

Selfors et al.

[11] Patent Number: 5,660,356

[45] Date of Patent: Aug. 26, 1997

[54] SYSTEM FOR PROVIDING POWER AND ROLL MOTION STABILITY IN A VEHICLE

[75] Inventors: Brian J. Selfors; Vijay M. Gondhalekar, both of Boston, Mass.

[73] Assignee: Satcon Technology Corporation, Cambridge, Mass.

[21] Appl. No.: 351,821

[22] Filed: Dec. 8, 1994

[51] Int. Cl.$^6$ ................................ B64C 17/06
[52] U.S. Cl. .................. 244/79; 74/572; 74/573 R; 244/3.2
[58] Field of Search .................. 244/75 R, 79, 244/165, 3.2; 74/5.33, 5.34, 572, 573 R, 584; 36/261

[56] References Cited

U.S. PATENT DOCUMENTS

| | | | |
|---|---|---|---|
| 796,893 | 8/1905 | Brennar | 74/5.34 |
| 2,183,314 | 12/1939 | Gaddare | 244/3.2 |
| 2,432,430 | 12/1947 | Lubashez | 74/5.37 |
| 2,653,457 | 9/1953 | Guernsey et al. | 74/572 |
| 2,757,050 | 7/1956 | Weber et al. | 74/572 |
| 2,811,047 | 10/1957 | Christoph | 74/5.34 |
| 3,456,512 | 7/1969 | Schmidt | 74/5.34 |
| 3,476,129 | 11/1969 | Halstenberg | 244/79 |
| 3,742,770 | 7/1973 | Flannelly | 74/5.34 |
| 4,193,308 | 3/1980 | Stuhler et al. | 74/5.34 |
| 4,443,727 | 4/1984 | Annen et al. | 74/572 |
| 4,472,650 | 9/1984 | Adiolotkin | 310/261 |
| 4,723,735 | 2/1988 | Eisenhague | 244/165 |
| 5,315,158 | 5/1994 | Danielson | 244/165 |

*Primary Examiner*—Galen L. Barefoot
*Attorney, Agent, or Firm*—Peter J. Manus, Esq.

[57] ABSTRACT

A dual flywheel assembly for use in an airborne vehicle for storing mechanical energy therein prior to flight and for permitting the extraction of electrical energy therefrom during flight, which assembly includes two flywheels which are linked by a suitable linkage structure such that, if roll motion of the vehicle starts to occur during flight, the flywheels tilt in equal and opposite directions out of their normal planes of rotation, which tilting motions act in a passive manner to stabilize the roll motion of the vehicle.

6 Claims, 3 Drawing Sheets

SYSTEM FOR PROVIDING POWER AND ROLL MOTION STABILITY IN A VEHICLE

This invention was made with Government support under Contract No. N68936-93-C-0090 awarded by the Department of the Navy. The Government has certain rights in the invention.

FIELD OF THE INVENTION

This invention relates generally to techniques for supplying electrical power in airborne vehicles, such as missiles, and, more particularly, to a novel technique which serves both to supply such power and to stabilize the roll motion of the vehicle.

BACKGROUND OF THE INVENTION

In providing power to an airborne vehicle, such as a missile, for example, during flight, battery packs, which are suitably charged before flight, are often used, which packs are usually relatively bulky and take up more space than is desired inside the vehicle. An alternative approach is to use a single flywheel which is activated before flight to store mechanical energy which can then be released to generate electrical energy during flight. Neither approach serves in any way to control or stabilize the roll motion of the vehicle which must be so stabilized in other ways. For example, such stabilization is often achieved merely through the use of fixedly positioned passive fins, or control surfaces, positioned at the tail end of the vehicle. Alternatively, stabilization has been achieved by designing relatively complex systems for controlling the vehicle's pitch and yaw control surfaces or by using gyroscopic control of the roll motion via appropriate control surface elements.

BRIEF SUMMARY OF THE INVENTION

In accordance with the invention, a technique has been devised for providing for both the prior storage and the subsequent extraction of energy for use in an airborne vehicle so as to generate electric power for operating the electrical components of the vehicle's electronic control, telemetering, or other systems, for example, and for assuring the roll stability of the vehicle during flight. In a particular embodiment of the invention, a pair of counter-rotating flywheels are mounted on an appropriate gimbal frame, the flywheels being suitably linked so that during rotation they precess, or tilt out of their normal planes, in equal and opposite directions. During flight if the vehicle starts to perform a roll motion due to external aerodynamic forces, gyroscopic torques are applied to the flywheels due to the roll rate. The flywheels tilt out of their normal planes, the titling motion of one of the flywheels being in an equal and opposite direction to the tilting motion of the other flywheel, so as to stop the roll motion and to keep the vehicle at a stabilized roll position. The tilting motions of the flywheels which produce such stabilizing operation is passive in nature and requires no active components in order to provide the stabilizing operation. Moreover, since any gyroscopic torques produced by the tilting motions of the flywheels are counter-active, since they may occur in equal and opposite directions, no cross coupling of such torques occurs into the pitch or yaw motions of the vehicle. Accordingly, not only is the stored energy appropriately extracted in order to provide electrical energy for use during flight, but such dual flywheel structure and the passive operation thereof also causes the vehicle to be roll stabilized. Since the dual flywheel configuration is marginally stable, the linkages between the flywheels can be further arranged to include a damping element, such as a dashpot, which element provides for a damping out of oscillations in the flywheels before destabilization can occur.

The flywheel and linkage assembly can be suitably fabricated in a relatively compact package so as to fit within the vehicle in a manner such that it takes up space therein which is comparable to that required for a battery package which supplies comparable electrical energy. However, in contrast with the use of battery packages, the assembly of the invention has the added advantage of being available not only to supply the desired electrical energy during flight but also simultaneously to stabilize the roll motion of the vehicle passively without the need for including further active roll stabilization components.

DESCRIPTION OF THE INVENTION

The invention can be described in more detail with the help of the accompanying drawings wherein FIG. 1 shows a diagrammatic view of a flywheel assembly of the invention as positioned within a vehicle such as a missile;

Figure 1:
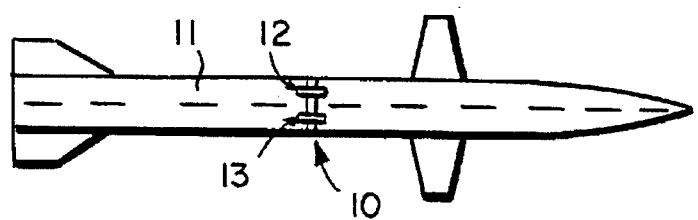
Figure 2:
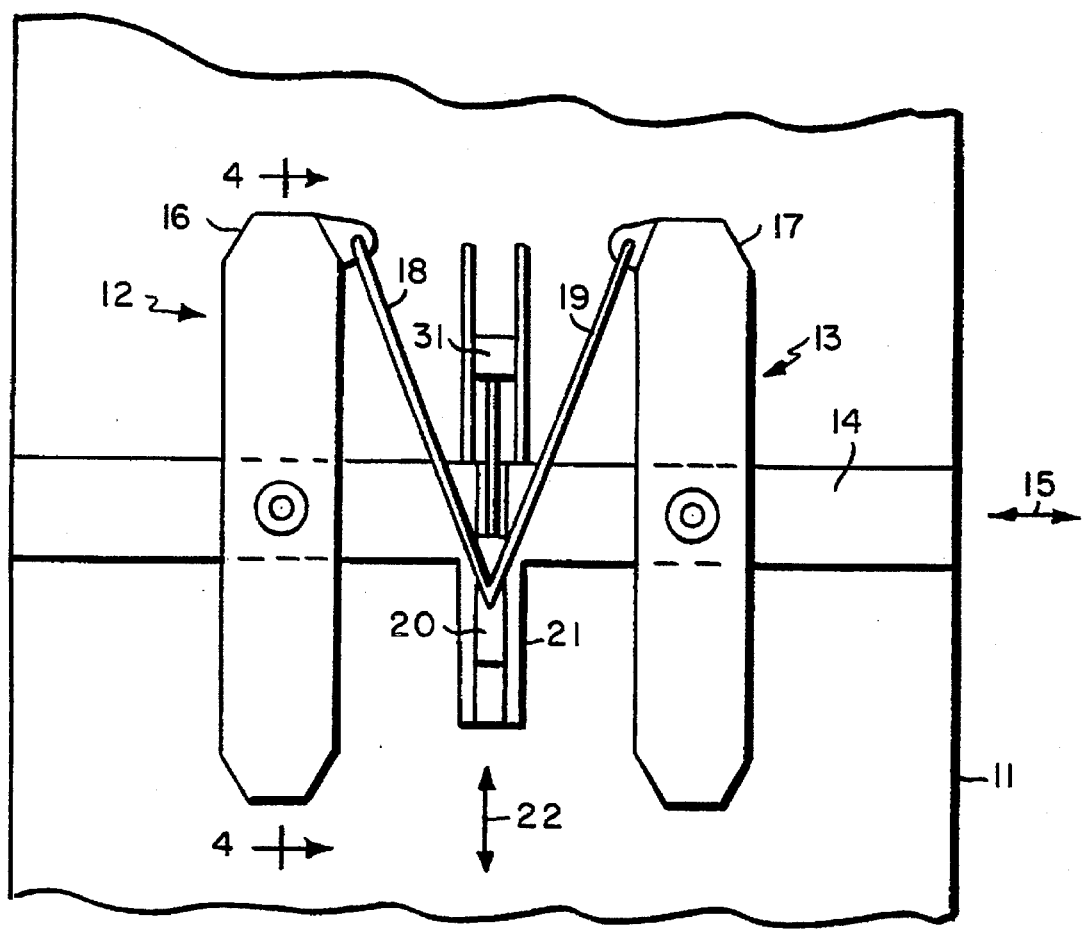
FIG. 2 shows a top view of the flywheel assembly of FIG. 1 in more detail, the flywheels thereof being in their normal planes of rotation.
Figure 3:
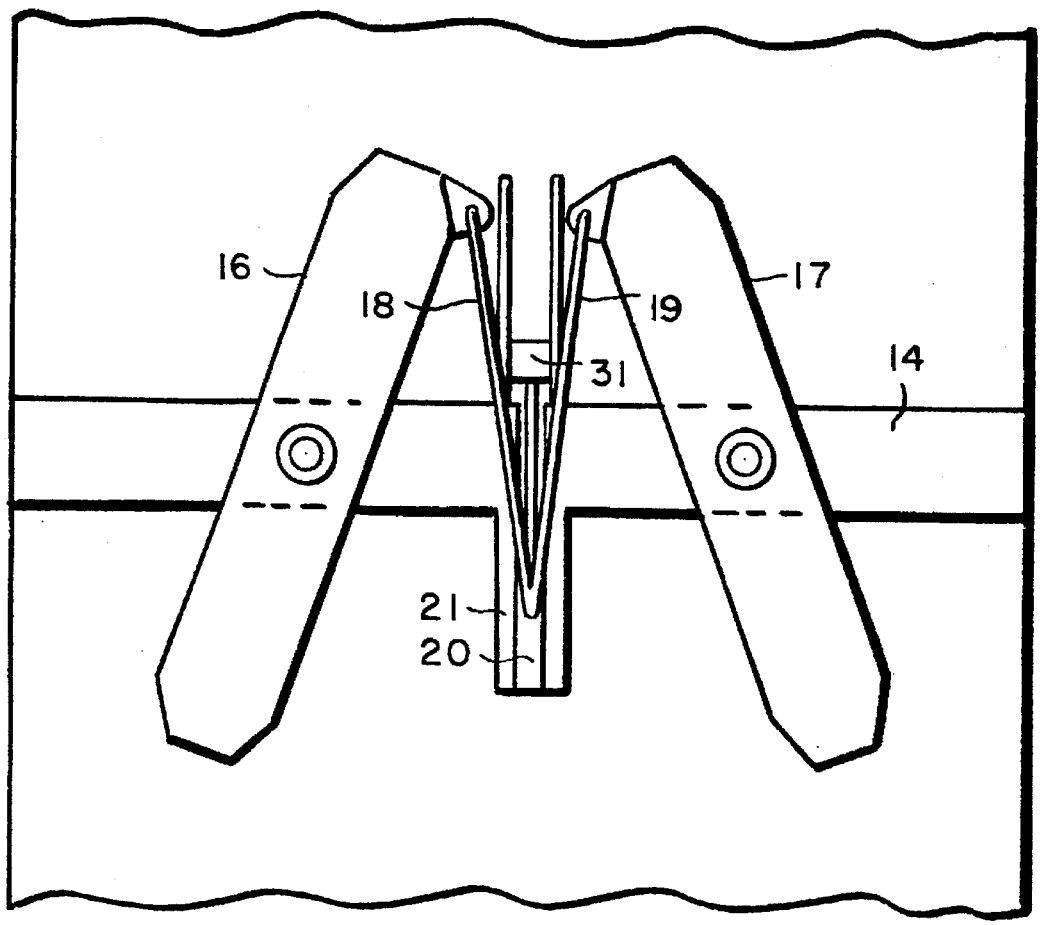
FIG. 3 shows a top view of the flywheel assembly of FIG. 2 wherein the flywheels are rotated out of their normal planes of rotation.

As can be seen in FIG. 1, a dual flywheel assembly 10 can be suitably mounted within a vehicle 11, such as a missile. More specifically, as shown in FIGS. 2 and 3, a first flywheel 12 and a second flywheel 13 each comprise cases 16 and 17, respectively, mounted in parallel planes on a gimbal support ring 14 so as to rotate about the same axis which lies along a direction indicated by arrow 15. FIG. 2 depicts the flywheels in their normal planes of rotation which are parallel to each other, as shown therein. The flywheels are mechanically linked via rigid linkages 18 and 19 which are each attached at one end to the tops of respective cases 16 and 17 and at their other ends to a sliding element 20 which is free to slide in a cylindrical channel 21 in a direction parallel to the normal planes of rotation of the flywheels, as shown by arrow 22, as the flywheels precess, or tilt, out of their normal planes during their rotation.

The linkages 18 and 19 and slider 20 are such that, when the wheels rotate during flight and both wheels tend to precess, i.e., to rotate or tilt out of their normal planes, in a passive operation, because of a roll motion of the vehicle, the wheels tilt in equal and opposite directions. Such operation produces gyroscopic effects to provide a torque about the axis orthogonal to the roll axis of rotation of the vehicle which produces a reaction torque to an externally induced roll motion torque and, thereby, stabilizes the roll motion of the vehicle. Accordingly, the vehicle's rolling motion is effectively stopped and the roll operation of the vehicle becomes stabilized. Exemplary equal and oppositely directed out-of-plane tilt motions of the flywheels are shown in FIG. 3. At the same time, the generators in the flywheels during flight extract the stored energy therein, as discussed below. Accordingly, the flywheel assembly is used not only to store energy prior to flight which energy can then be extracted during flight, but the assembly is such that during flight it performs the function of passively stabilizing the roll motion of the vehicle.

Figure 5:
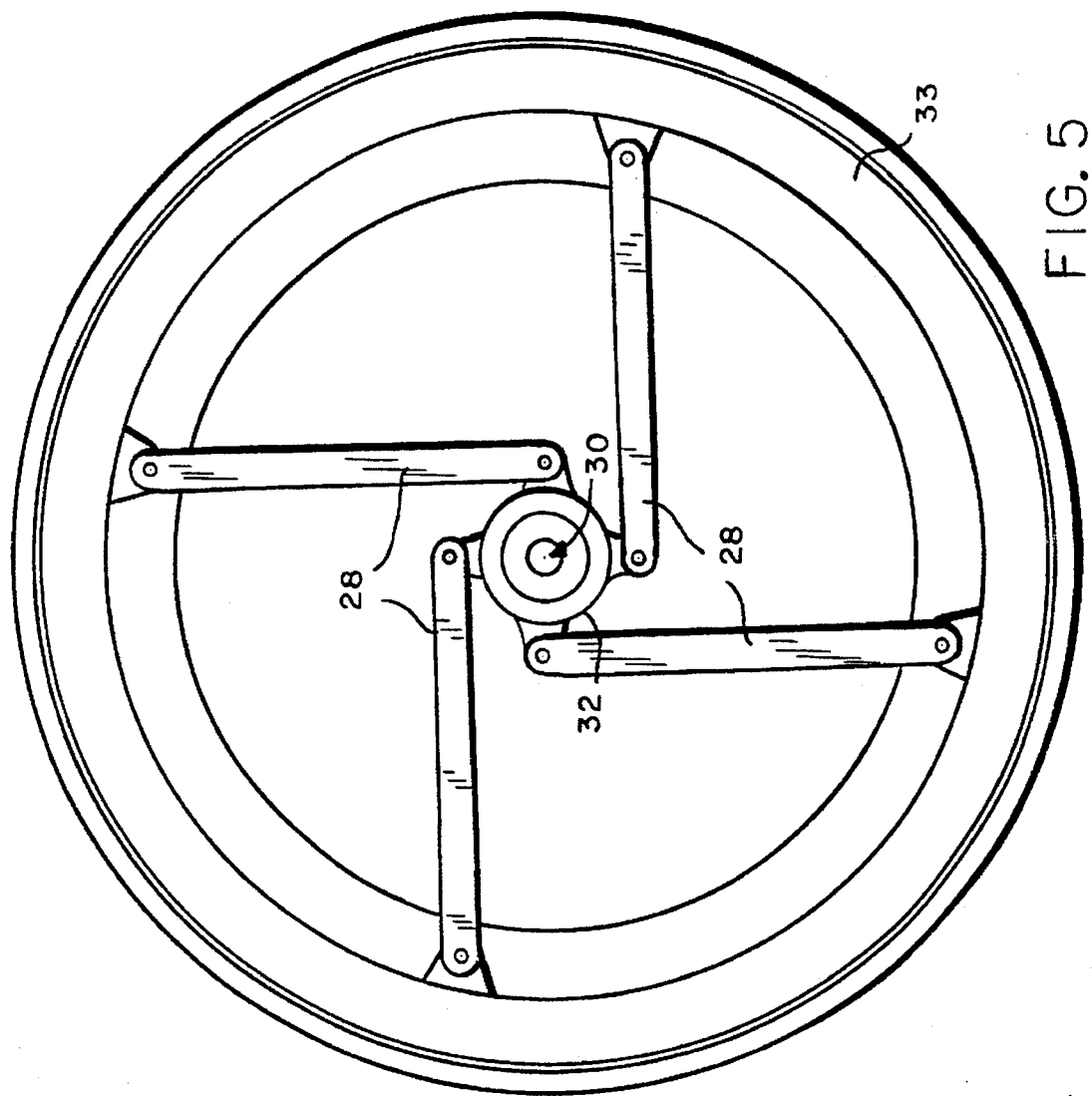
FIG. 5 shows a side view of the flexible linkages used in the flywheel structure of FIG. 4.
Figure 4:
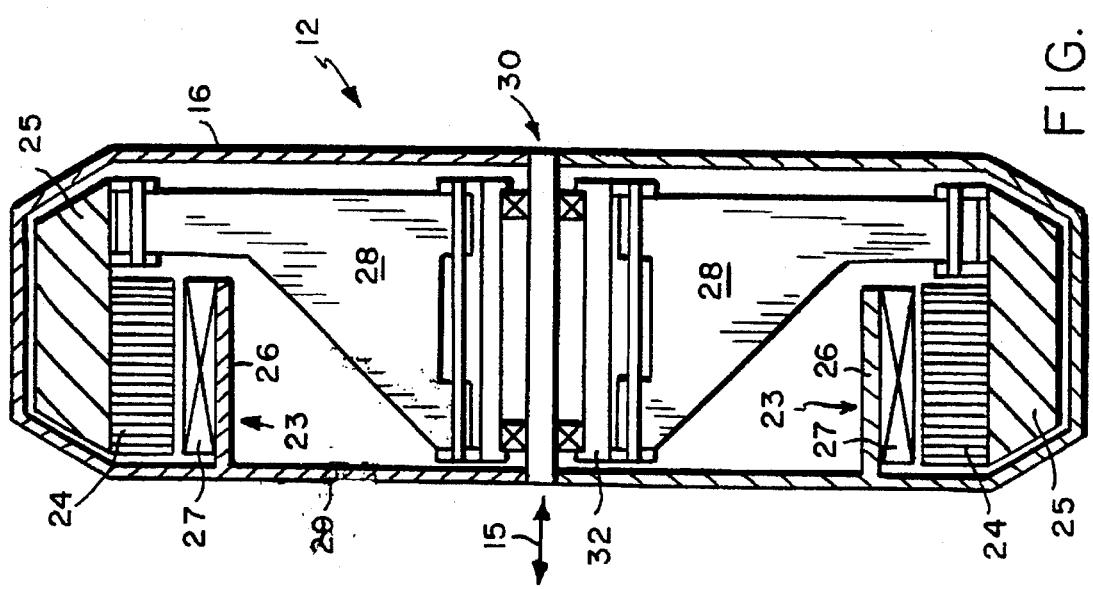
FIG. 4 shows a cross-section view along the line 4—4 of the structure of one of the flywheels of FIG. 2.

A particular embodiment of an exemplary flywheel structure, such as flywheel 12 in case 16 is depicted in cross-section in FIG. 4 and in a side view in FIG. 5. Flywheel 13 in case 17 has substantially the same structure. As seen therein, the flywheel includes therein a motor/generator unit 23 comprising a rotor component which includes a plurality of magnets 24, together with a rim iron element 25, and a stator component which includes element 26 affixed to the case 29 of the flywheel and a coil 27 mounted thereon, which coil, when energized via an input power cable from an external power source (not shown), causes the motor to rotate the flywheel about a shaft 30 mounted in suitable bearings. Thus, an input cable supplies D-C electrical power, for example, via a suitable plug and socket assembly (not shown) so that prior to flight the unit 23 operates as a motor to cause rotation of the flywheel and, hence, the storage of mechanical energy therein, as would be well known to those in the art. Following energy storage, the input power cable can be removed from the plug and socket assembly so that, for flight, a suitable output cable (not shown) can be connected at the plug and socket assembly to deliver, during flight, electrical power to electrical circuitry used internally within the vehicle at which time the unit 23 acts as a generator, as would also be well known to those in the art. Thus, the D-C electrical energy generated at coil 27 can be supplied from the generator to the desired circuitry via the output cable.

In order to avoid physical distortions of the wheel due to asymmetrical loading and restraint during operation, an arrangement of flexible links is preferably used to hold the wheel as shown in FIG. 5. As seen therein, the wheel is held axially by four flexible links 28 which are hingedly affixed at one end to a hub 32 and connected at their other ends to a rim 33. The links 28 allow the wheel, in effect, to grow out or expand radially, while restraining the rim from bending or moving axially. The links further provide a configuration which allows the incorporation of the motor/generator unit 23 on one side of the wheel, as shown in FIG. 4. Thus, the link structure shown prevents distortions that would arise if solid links were used.

Because of the unique linkage structure used between the flywheels comprising links 18, 19, and slider 20, tilting motions, of both of the flywheels in equal and opposition directions out of their normal planes of rotation due to a roll motion of the vehicle occurs during flight and the roll motion is stabilized. In addition, the mechanical energy that has been stored therein can be converted to electrical energy and suitably extracted for supplying electrical power energy to various electrical components within the vehicle.

In some cases, the friction between the mechanical parts that make up the overall flywheel assembly may generally tend to prevent any adverse effects due to mechanical resonance conditions which might arise during flight and destabilize the flywheel operation, such friction effects in effect damping out the resonance conditions. In other cases, however, the frictional damping effect may not be sufficient and it is helpful to include an added damping element, as in the form of a mechanical dashpot 31, for example, which is suitably attached to slider 20 as shown in FIGS. 2 and 3. The use thereof provides for adequate damping in cases where such resonance conditions may be relatively severe.

The system of the invention can be made relatively compact so as to be positioned wholly within a vehicle, e.g., within the skin of a missile, so as to automatically provide for roll motion stability by the energy source during flight without the need for separate active roll motion control systems or components.

While the above embodiment of the invention is preferred, modifications thereto may occur to those in the art within the spirit and scope of the invention. Hence, the invention is not to be construed as limited to the particular embodiments disclosed, except as defined by the appended claims.

What is claimed is:

1. A system for providing power and roll stability in a vehicle comprising first and second flywheels for storing energy prior to flight of the vehicle and for permitting the extraction of the stored energy to provide electrical energy during flight thereof, said flywheels being mounted on a gimbal ring within the vehicle so as to rotate normally about a common axis in parallel planes of rotation during flight of the vehicle; and a linkage structure for linking the first and second flywheels during rotation such that, if the vehicle starts to perform a roll motion during flight, both of the flywheels tilt out of their normal planes of rotation, the tilting motions thereof being in equal and opposite directions so as to passively stabilize the roll motion of the vehicle.

2. A system in accordance with claim 1, wherein said linkage structure includes a pair of link elements each connected at one end thereof to respective ones of said flywheels and at the other end thereof to a common slide element which is arranged to slide in a direction parallel to the normal planes of rotation of the flywheels, whereby both flywheels tilt in equal and opposite directions out of their normal planes of rotation.

3. A system in accordance with claim 2, wherein said linkage structure further includes a damping element connected to said slide element for damping out oscillations which may occur in the flywheels during flight.

4. A system in accordance with claim 3, wherein said damping element is a dashpot.

5. A system in accordance with claims 1, 2, or 3, wherein said flywheels each include therein a motor/generator unit which uses input electrical energy to operate as a motor to cause the flywheel to rotate so as to store mechanical energy therein and which operates as a generator to extract the stored mechanical energy so as to supply electrical energy from the flywheel.

6. A system in accordance with claims 1, 2, or 3, wherein said flywheels are each held by a plurality of flexible links hingedly connected at one end to a rotating hub and connected at the other ends to a rim so as to permit the flywheel to expand in a radial direction, while the rim is restrained from bending or moving in an axial direction.

* * * * *